United States Patent
Kruusmaa et al.

(10) Patent No.: US 9,655,395 B2
(45) Date of Patent: May 23, 2017

(54) METHOD AND SYSTEM FOR CUSTOM TAILORING AND RETAIL SALE OF CLOTHING

(75) Inventors: Maarja Kruusmaa, Tallinn (EE); Alvo Aabloo, Tartu (EE); Artur Abels, Tallinn (EE); Roman Leinus, Tartu (EE); Heikki Haldre, Tallinn (EE); Paul Pällin, Tartu (EE); Ene Hindpere, Tallinn (EE)

(73) Assignee: Massi Miliano Ltd., Tallinn (EE)

( * ) Notice: Subject to any disclaimer, the term of this patent is extended or adjusted under 35 U.S.C. 154(b) by 104 days.

(21) Appl. No.: 12/562,560

(22) Filed: Sep. 18, 2009

(65) Prior Publication Data

US 2010/0070384 A1 Mar. 18, 2010

Related U.S. Application Data

(63) Continuation-in-part of application No. PCT/EE2008/000003, filed on Mar. 19, 2008.

(60) Provisional application No. 60/895,611, filed on Mar. 19, 2007.

(51) Int. Cl.
| | |
|---|---|
| G06Q 30/00 | (2012.01) |
| G06F 17/30 | (2006.01) |
| A41H 1/00 | (2006.01) |
| A41H 5/01 | (2006.01) |
| G06Q 30/02 | (2012.01) |
| G06Q 30/06 | (2012.01) |
| A47F 8/00 | (2006.01) |

(52) U.S. Cl.
CPC .......... *A41H 1/00* (2013.01); *A41H 5/01* (2013.01); *A47F 8/00* (2013.01); *G06Q 30/02* (2013.01); *G06Q 30/0601* (2013.01)

(58) Field of Classification Search
CPC ................ A41H 1/00; G06Q 30/0601
USPC ............................................. 705/26–27
See application file for complete search history.

(56) References Cited

U.S. PATENT DOCUMENTS

| | | | | |
|---|---|---|---|---|
| 4,739,911 A | * | 4/1988 | Quinn | 223/85 |
| 4,793,530 A | * | 12/1988 | Krotseng | 223/68 |
| 4,885,844 A | * | 12/1989 | Chun | 33/15 |
| 5,409,150 A | * | 4/1995 | Tranquilli | 223/68 |
| 5,566,867 A | * | 10/1996 | Goray | 223/66 |
| 5,930,769 A | | 7/1999 | Rose | |
| 6,415,199 B1 | * | 7/2002 | Liebermann | 700/132 |
| 6,546,309 B1 | * | 4/2003 | Gazzuolo | 700/132 |

(Continued)

OTHER PUBLICATIONS

Eisenberg, A. (Aug. 13, 1998). If the shoe fits, click it. New York Times Retrieved from https://search.proquest.com/docview/431026208?accountid=14753.*

*Primary Examiner* — Kathleen Palavecino
(74) *Attorney, Agent, or Firm* — Dentons US LLP (57) ABSTRACT

Demonstrating a piece of real clothing to a customer to facilitate a trying-on and purchasing process includes: obtaining a set of data, representing the customer's body configuration, determining from the set of data a first standardized size for a piece of clothing that is a close match to the customer's body configuration, putting a first piece of real clothing with the first standardized size on a real mannequin with measurements corresponding to the set of data representing the customer's body configuration, obtaining a first image or set of images showing the first piece of clothing on the real mannequin; and presenting to the customer the first image or set of images showing the first piece of real clothing.

17 Claims, 8 Drawing Sheets

(56) References Cited

U.S. PATENT DOCUMENTS

| | | | |
|---|---|---|---|
| 6,624,843 B2* | 9/2003 | Lennon | 348/61 |
| 6,879,961 B1* | 4/2005 | Pathirana | 705/16 |
| 7,079,134 B2* | 7/2006 | Kung et al. | 345/420 |
| 7,826,997 B2* | 11/2010 | Wang | 702/127 |
| 2002/0138170 A1* | 9/2002 | Onyshkevych et al. | 700/130 |
| 2002/0188372 A1* | 12/2002 | Lane et al. | 700/130 |
| 2004/0222249 A1* | 11/2004 | Bentham et al. | 223/66 |
| 2005/0234782 A1* | 10/2005 | Schackne et al. | 705/27 |
| 2007/0100491 A1* | 5/2007 | Burrell et al. | 700/138 |
| 2008/0262944 A1* | 10/2008 | Wu | 705/27 |
| 2008/0288370 A1* | 11/2008 | Kim et al. | 705/27 |
| 2009/0018926 A1* | 1/2009 | Buehlman | 705/26 |
| 2009/0144173 A1* | 6/2009 | Mo et al. | 705/27 |
| 2009/0204335 A1* | 8/2009 | Wang | 702/19 |

\* cited by examiner

METHOD AND SYSTEM FOR CUSTOM TAILORING AND RETAIL SALE OF CLOTHING

CROSS REFERENCE TO RELATED APPLICATIONS

This application is a continuation in part of PCT application PCT/EE2008/000003, filed on Mar. 19, 2008, and claims the benefit of U.S. provisional patent applications No. 60/895,611, filed on Mar. 19, 2007. Both applications are incorporated herein by reference for all purposes.

FIELD OF TECHNOLOGY

The invention relates to the field of applications for tailoring and retail sale of clothing, including custom tailored clothing such as suits for men and women. The invention combines different body measuring methods with online retail sale of clothing and tailoring to provide the customers with more customized shopping experience, including custom tailoring through online environment.

BACKGROUND ART

The majority of clothing sold today is mass produced in factories to limited standardized sizes. Typically, in retail shops, the customer finds a piece of clothing based on size marked on the clothing and then tries on several pieces of clothing to find the size that suits. However, in an online environment, e.g., in an online shop, the pieces of clothing cannot be tried on. Therefore, the online shopper can relay only on the size indicated by the clothing manufacturer. Unfortunately, there are many different systems of clothing measurements around the world, e.g., an international standard ISO 3635 (Size designation of clothes—Definitions and body measurement procedure), the European Union new standard EN 13402 (not yet in common use), and many national standards. In some countries like in the USA and in UK, different systems exist. Further more, systems of clothing measurement tend to change over time and have variations between manufacturers. The online shopper is left with very little guidance as to what size fits her best. Often, the online shoppers are not satisfied with the received pieces of clothing and they will return these items to the shop. For the online shop, returned items means lost profit, increased costs and reduced customer satisfaction. Therefore, there is a need for a system and method assisting the online shoppers to make better purchasing decisions.

Another commonly known observation is that virtually no two persons have an identical body shape or configuration. Thus, providing well fitted clothing, particularly suits for men and women, to each customer through the use of several pre-set standardized clothing sizes and without any alterations is nearly impossible. It is typical for retail establishments to fit each customer with clothing of an approximate size. Rarely does the clothing precisely fit the particular body configuration of the customer. Professional clothing salesperson will then typically mark the clothing for alteration and the clothing will be sent to a tailoring shop for adjustment. Thereafter, the customer must return to the retail shop to pick up the clothing. At that time, the customer will typically put on the clothing to have the clothing inspected in its finished form to insure that proper tailoring adjustments have been made. In cases where the measuring or tailoring functions were inaccurate, the clothing will be sent back again to the tailoring shop for further adjustment. This is obviously a cumbersome, time consuming and expensive task. In online environment, altering and fitting cannot be accomplished using traditional means.

Known alternative to the retail shop alteration process is to obtain accurate measurements of the physical body configuration of the customer prior to manufacture of the clothing (custom tailoring). There are two ways for carrying out the measurements. Using manual procedures involve the retailer taking only the measurements required for the individual product. Different approach is to use two or three dimensional scanner(s) to automatically measure the whole body in one step. The advantage of the second approach is that from one measurement set, the retailer can derive all measurements required to produce different types of clothing (e.g., shirts, trousers, jackets, etc). At the same time, this procedure is more expensive and requires a good investment in the scanner technology. Also, the retailer needs to be able to derive the individual measurement sets for products from the complete measurement data.

Several computer-aided design (CAD) systems have been developed for clothing industries, such as the E-Taylor project (see http://www.atc.gr/e-tailor/). These systems have limited usability. Even though the cuttings can be prepared based solely on the measurements taken from the customer (either by traditional means, or using advanced technology, such as the 3D body scanning), such system will not take into consideration that no human body is perfectly symmetrical and flawless. For example, due to posture flaws, person's one shoulder is often slightly higher than the other. In such situation, a good tailor would try to optically hide the flaw with the clothing. Also, the look of a piece of clothing strongly depends on the fabric used, i.e., how thick it is and how it falls. Therefore, even with the 3D body scanning and delivering the 3D image to the manufacturing location, the crucial part is still to try on a real piece of clothing on a real customer. Obviously, instead of trying the clothing on the customer, a mannequin, being an accurate representation of the customer, could be used.

One option, used in fashion and entertainment industry, is to manufacture a mannequin that is a duplicate of the customer's body. However, this approach is prohibitively expensive in most cases; also, most people do not order all their clothing from the same place, which further drives up the cost.

An alternative is to use adjustable mannequins so that the same mannequin can be adjusted for many customers. Mechanically adjustable mannequins (tailor's dummies) are known in customized tailoring. However, such mannequins are adjusted manually and the extent of their adjustability is limited. An adjustable mannequin that could be controlled by a computer is suggested (but not described) in U.S. Pat. No. 4,885,844. Described manually adjustable mannequin comprises a vertical support element and a series of elliptical, circumferentially adjustable elastic elements, both the major and minor axis of which can be adjusted using control bolt screws and a simple crank shaft screwdriver.

What are needed therefore, are systems and methods for custom tailoring in an online environment. Also needed is an adjustable mannequin that is computer controllable, so that the operator can adjust it automatically, semi-automatically or manually to accurately represent the customer's body.

Further more, there is a need for a mannequin that can not only be adjusted to represent realistically different sizes and shapes of customer's body, but also to move in a controlled manner to mimic characteristic movements of human body at the time of trying on and wearing the clothing to give more realistic view of how piece of clothing fits),

DISCLOSURE OF THE INVENTION

One objective of the invention is a method for demonstrating a piece of clothing to a online shopper in an online environment to facilitate the trying process, the method comprising obtaining the shopper's measurements over an online connection, determining a first standardized size corresponding to said shopper's measurements; putting said piece of clothing on a mannequin having shopper's measurements; obtaining a first set of images representing said piece of clothing on said mannequin; and presenting the shopper with said first set of images. The customer can see very close approximation how would the piece of clothing look at her. Obtaining the measurements of the customer may include providing the measurements by any known means, e.g., by filling in an online form, by electronic measuring tape, by photographing or video recording the customer and extracting the measurements from the photographs or video recordings, or by 3D body scanning. The mannequin may be selected from a set of mannequins with standardized sizes. Also, an adjustable mannequin or a computer adjustable mannequin can be preferably used, as they can be fine tuned to represent the shopper's measurements and body type. Also, a natural human being can be used as a mannequin. The method may also include putting on said mannequin items of the clothing that are one (or more) standardized size larger and one (or more) standardized size smaller than the first predetermined size for determining the best fit.

Another objective of the invention is a system where the above method is applied in the context of online custom tailoring. Such integrated system for custom tailoring comprises a 3D body scanning system or other suitable system for acquiring a set of measurement data corresponding to a customer, transmitting said set of data to a second location, adjusting a mannequin in said second location to mimic the customer, manufacturing the clothing, trying it on the mannequin, photographing or video recording the clothing on the mannequin, delivering the photographs or video recordings to the customer (or, to the supervising tailor) for approval, and delivering the piece of clothing to the customer. The adjustable mannequin is preferably computer controllable, so that the operator can adjust it automatically or semi-automatically to mimic the particular customer.

Another objective of the invention is a method of custom tailoring, comprising obtaining a three dimensional image of the body of a customer by three dimensional scanning of the customer in a first geographical location, entering said three dimensional image of the customer into a first computer located in said first location and transferring the image over a network to a to a second computer located in a second geographical location, calculating a set of body measurements from said three dimensional image of the customer; using the set of body measurements to adjust a computer controllable mannequin, connected to said second computer; and using said mannequin for custom tailoring and fitting.

Another objective of the invention is a computer controllable mannequin that can be used in above systems and to perform the above methods, the mannequin comprising right and left shoulder portions that allow adjusting the position of each shoulder separately up and down, back and forth, and right and left. The mannequin may further comprise neck portion so that the diameter as well as necks slope can be adjusted.

BRIEF DESCRIPTION OF THE DRAWINGS

FIGS. 2 to 7 depict an embodiment of computer controlled adjustable shoulder mannequin according to present invention, where

MODES FOR CARRYING OUT THE INVENTION

According to the first embodiment of the invention, a method for demonstrating a piece of clothing to an online shopper in an online shop to facilitate the trying on process is disclosed. The online shop can be accessed through a computer, connected to the Internet, or through a smart phone, a pocket PC, or other device, having access to the online shop through a data network. The online shopper is in a first location and the online shop (or, a factory or a tailor's shop or a warehouse) is in a second location, but they are connected over wired or wireless data network, e.g., LAN or Internet. The method comprises the steps of obtaining the shopper's measurements, determining a first standardized size corresponding to said shopper's measurements; putting said piece of clothing on a mannequin corresponding to shopper's measurements; obtaining a first set of images representing said piece of clothing on said mannequin; and presenting the shopper with said first set of images. The customer can see very close approximation how would the piece of clothing look at her. Obtaining the measurements of the customer may include providing the measurements by any known means, e.g., by filling in an online form, by electronic measuring tape, by photographing or video recording the customer and extracting the measurements from the photographs or video recordings, or by 3D body scanning. The mannequin may be selected from a set of mannequins with standardized sizes. Also, an adjustable mannequin or a computer adjustable mannequin can be preferably used, as they can be fine tuned to represent the shopper's measurements (such computer adjustable mannequin is described below). Also, a natural human being can be used as a mannequin. The method may also include putting on said mannequin items of the clothing that are one (or more) standardized size larger and one (or more) standardized size smaller than the first predetermined size similarly to a shopping process in a brick and mortar stores where the customer tries on several different sizes of the same piece of clothing to decide which one has the best fit.

To further improve the shopping experience, a video clip with up to 360° view of the mannequin wearing the piece of clothing is provided, either by rotating the mannequin in front of the camera, by moving the camera around the mannequin, or by combining images from several cameras located around the mannequin. Also, to show the fit of the clothing, wind may be blown to the mannequin while video recording the clothing.

If computer controllable mannequin is used, it can be moved to more realistically represent customer's body, e.g., one or both shoulders of the mannequin my be moved up and down, back and worth, or certain measurements of the mannequin can be altered, e.g., the chest measurement can be altered to mimic breathing and the waist measurement can be altered to compare fit with empty and full stomach.

If full body computer controllable mannequin is used, it can be set up to mimic also moving arms and legs, e.g., walking, bending, sitting, stretching or other activities.

The same system can be used not only in an online shop, but also in a retail shop. In this case, the pieces of clothing in stock with different sizes are already put on mannequins of different sizes and photographed and/or video recorded. The photos (or videos) help the customer to estimate, how the piece of clothing suits her without trying on different sizes.

Figure 1:
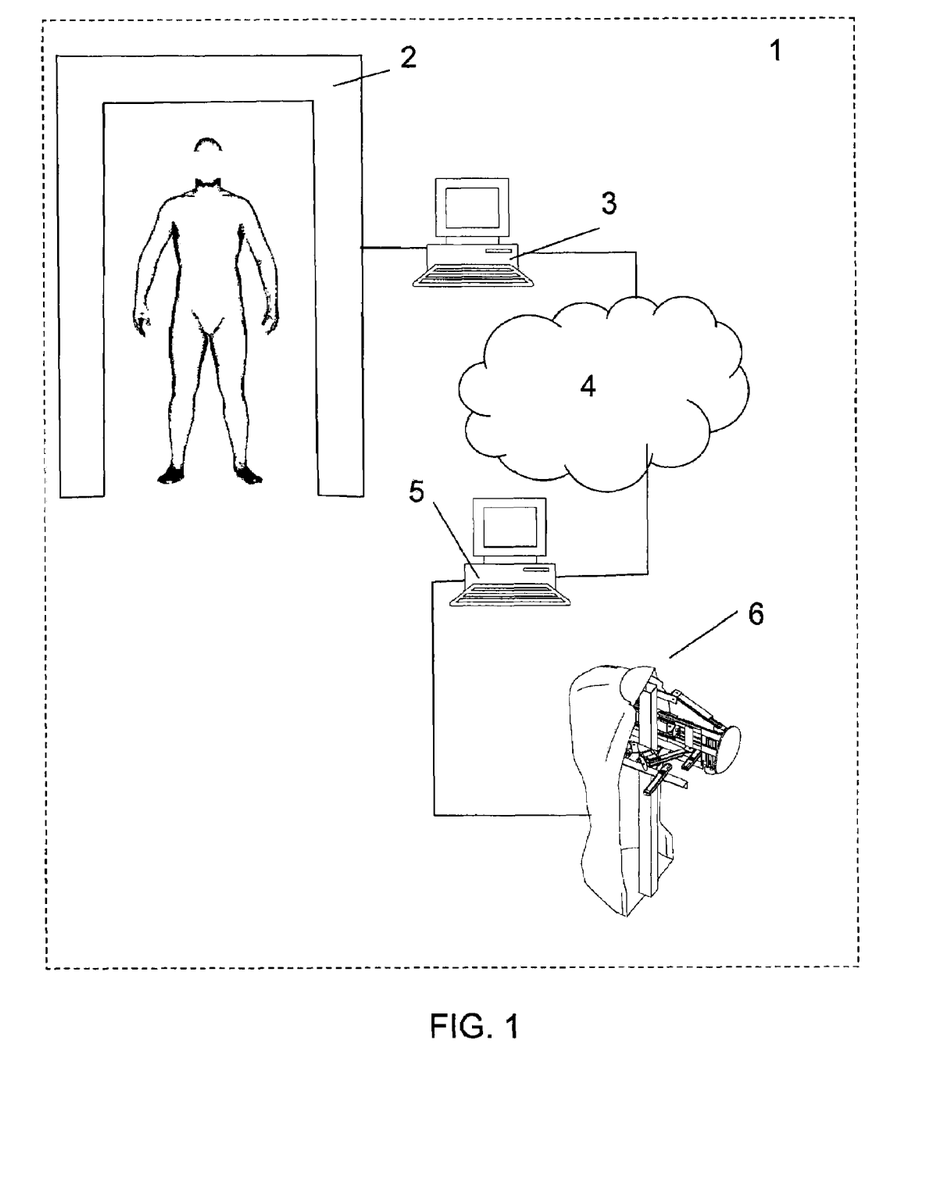
FIG. 1 depicts a scheme of the system where the invented method of online custom tailoring could be practiced.
Figure 2:
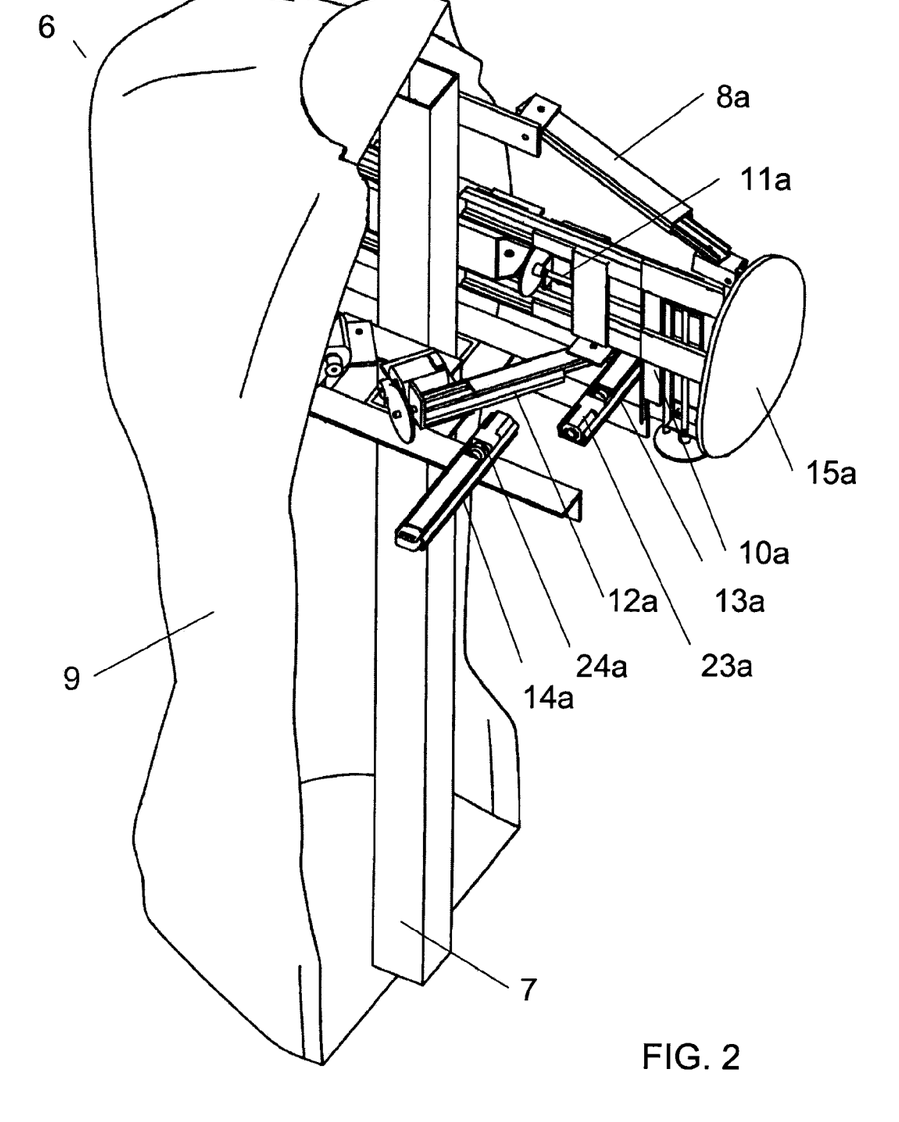
FIG. 2 is a perspective view of the mannequin.
Figure 3:
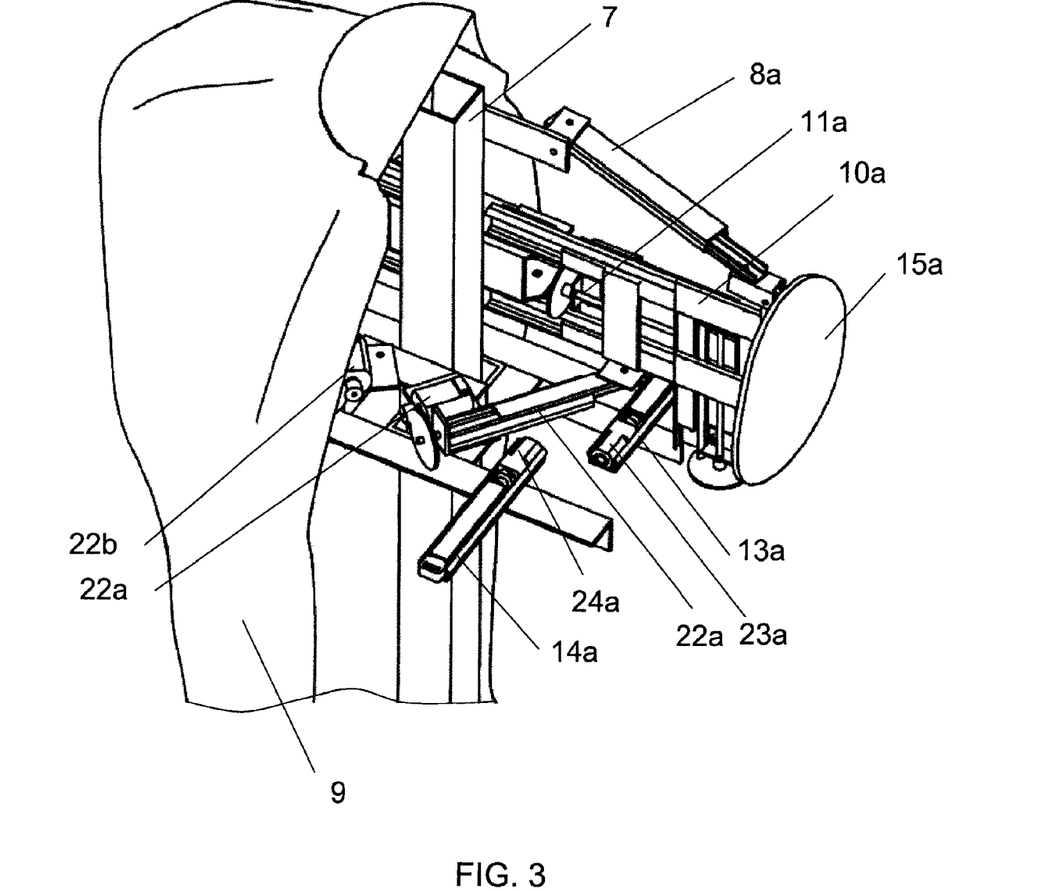
FIG. 3 is an enlarged view of the mannequin.
Figure 4:
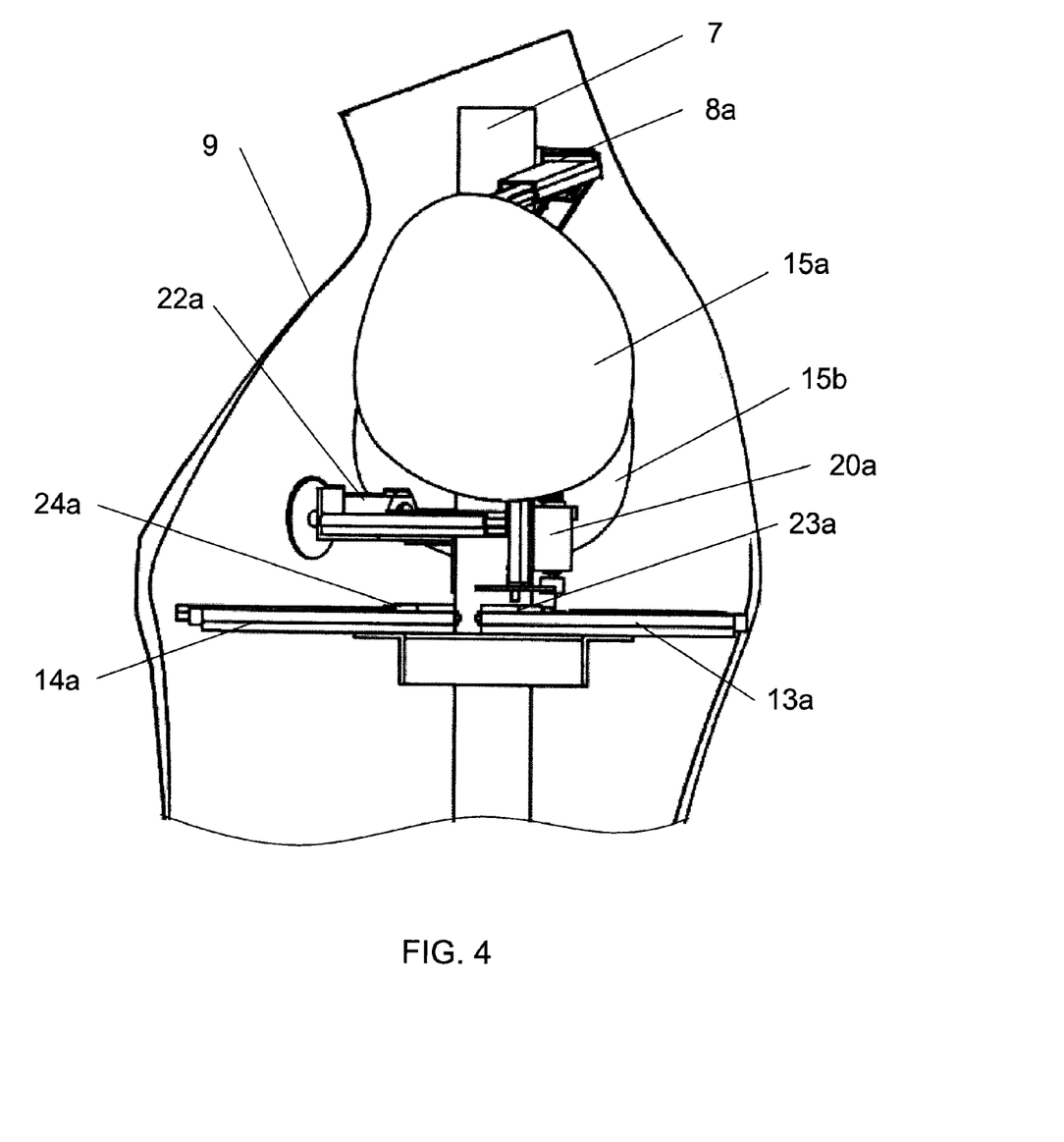
FIG. 4 is a side view of the mannequin.
Figure 5:
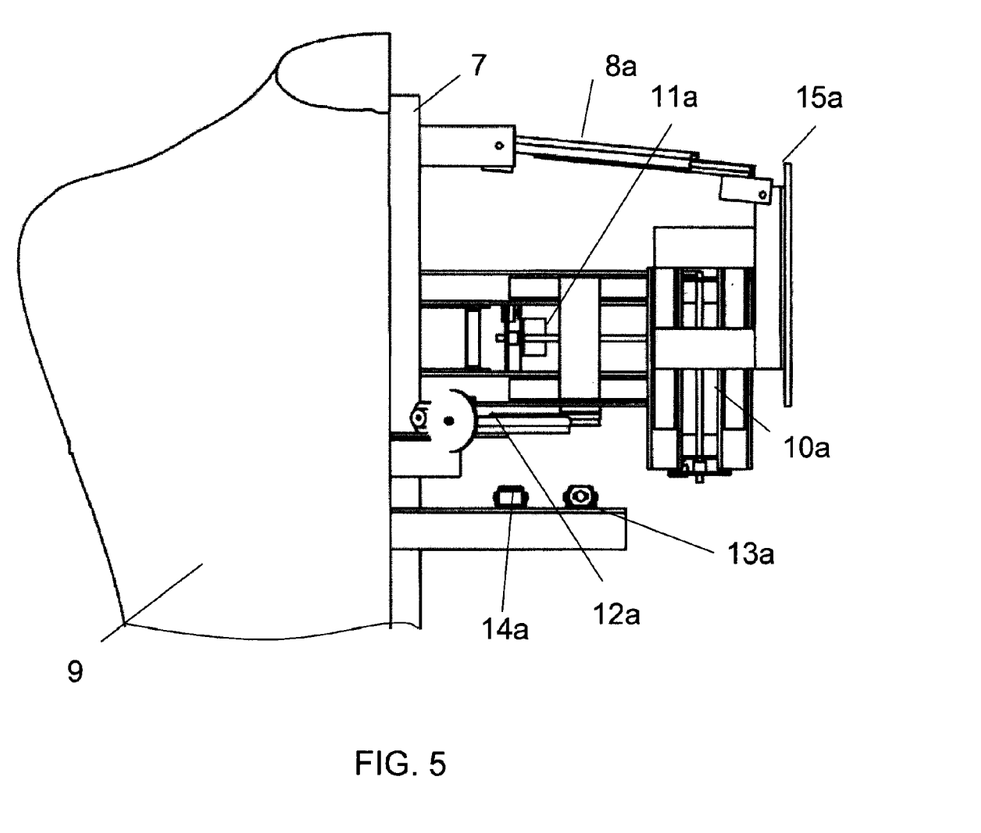
FIG. 5 is a front view of the mannequin.
Figure 6:
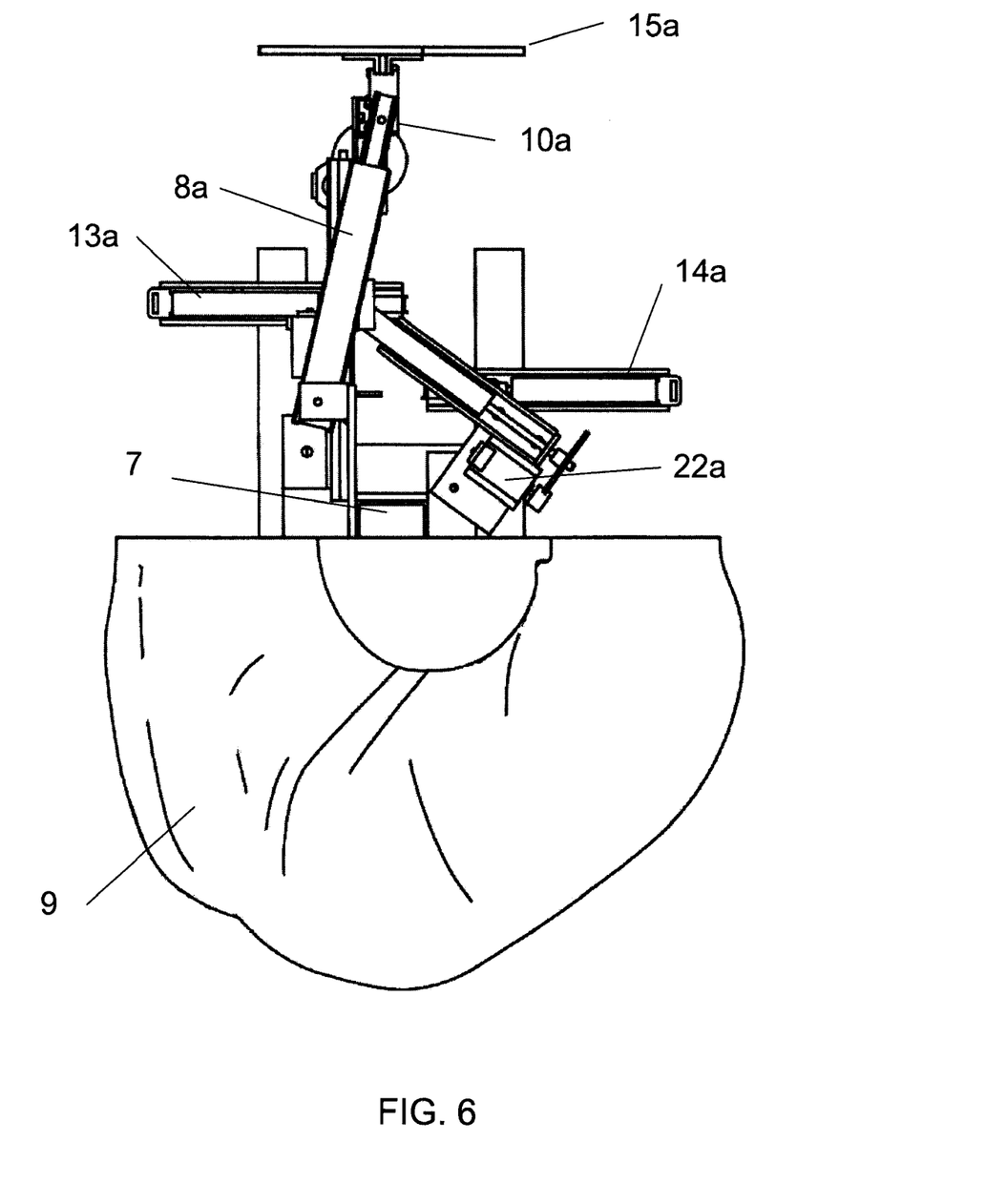
FIG. 6 is a top view of the mannequin.
Figure 7:
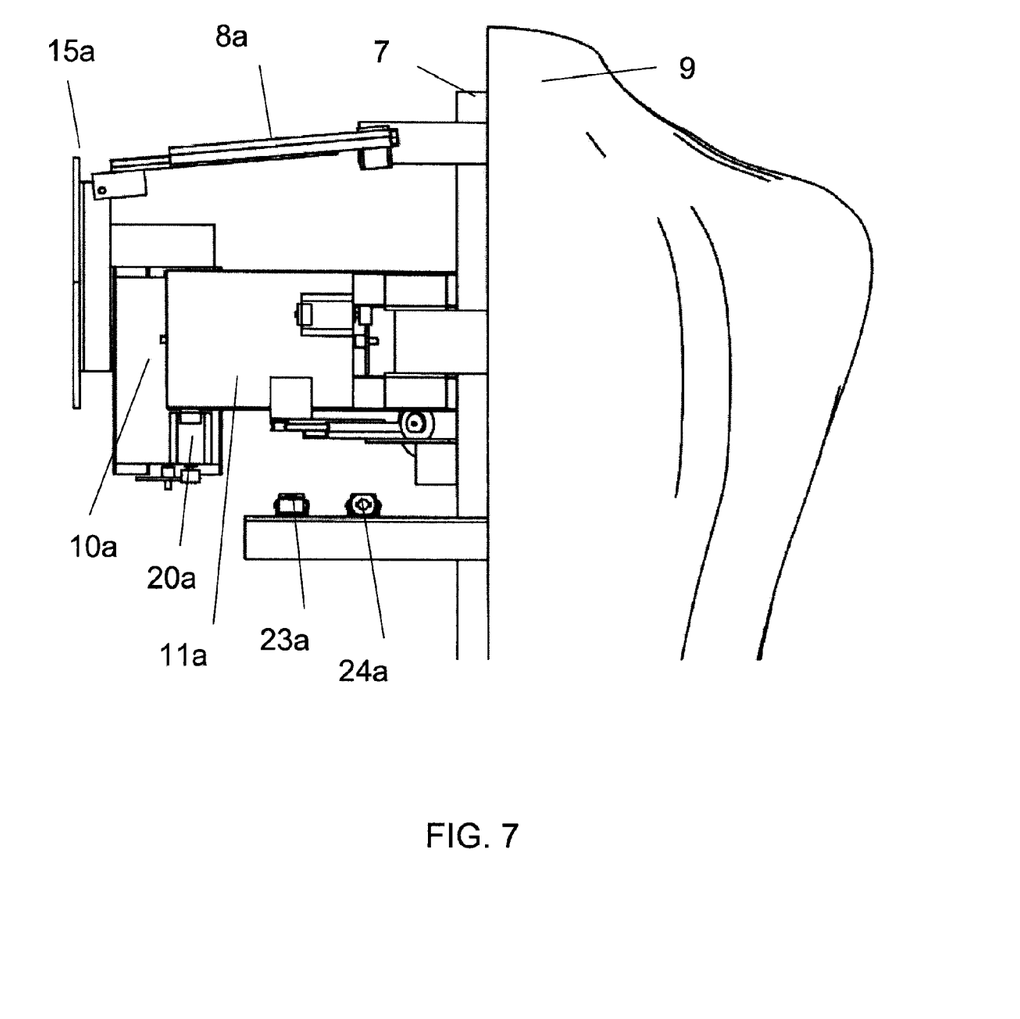
FIG. 7 is a back view of the mannequin.

FIG. 1 depicts a scheme of the system 1, where the method of online custom tailoring can be practiced. In a first location, the customer enters a three-dimensional (3D) body scanning device 2. A 3D image of the customer is taken (it is apparent that the scanning device can be customer-operated, or operated by an operator, e.g., by a salesperson in a store). Several technologies are available for 3D body scanning, including technologies based on white light, infrared, radio waves, radar, or laser scanning. Currently, white light scanners are most promising because their maintenance cost and perceived safety. Such technology is available from number of manufacturers (e.g., Human Solutions GmbH in Germany).

The 3D image is then transferred to a first computer 3, connected with the body scanning device 2. In the first computer, several data processing steps may be performed on the 3D image. For example, linear dimensions, surface areas, shapes, and volumes are calculated and/or the 3D image is compressed or edited for reduced file size, or edited to protect the privacy of the customer (e.g., by blurring the customer's face) or to make the image more acceptable for viewing.

The set of data, corresponding to the body size and shape of the customer, is then transferred, over a computer network 4, into a second computer 5 in a second location (a factory or tailor's shop that can be in another region or country). An adjustable mannequin, either fully or semi computer controllable, is connected to the second computer. The mannequin can be adjusted to accurately represent the body of the customer. Then, the adjusted mannequin can be used to custom tailor a piece of clothing, such as a jacket or suit, for the customer. The process of trying the piece of clothing can be photographed or video recorded and the image(s) can be transferred, through a computer network 2, or through other suitable communication channel (e.g., a 3G cellular network) to another location, e.g., to the customer, or to the sales person, to designer or to another tailor (for approval or for quality control purposes). The piece of clothing can be shown on the mannequin. Alternatively, an image of the piece of clothing can be combined with an image of the customer to provide more real life like trying experience. Also, the images or the video recording could be stored in either or both the first and the second computer, or in another computer in one of the locations, or in third location for future use.

The mannequin having the sufficiently accurate measurements of the customer can also be used to determine the quality of the fit of the computer assisted made-to-measure tailored products.

The mannequin is preferably a computer controllable and computer adjustable. The mannequin must be adjustable at least to the extent, required by the type and character of a particular piece of clothing. For example, for men's jackets, the most critical part is shoulders. In FIGS. 2 to 7 is depicted one embodiment of such mannequin, allowing adjusting the width of the shoulders, slope of the shoulders and the shape of the chest and shoulders. Importantly, right and left side (e.g., the slope of right and left shoulders) could be adjusted separately as virtually no person is perfectly symmetrical.

The mannequin 6 comprises a vertical support 7 and two shoulder linkages 8a and 8b connected to said vertical support. Shoulder linkages can be rotated relative to the vertical support in two directions (i.e., around both vertical and horizontal axis). The linkages have telescopic or other suitable structure, so the length of the linkages can be adjusted.

The shoulder linkages provide support for the shoulders of the mannequin, defining the slope of the shoulders as well as the position of the shoulder tip and shoulder plate 15. The mannequin has a cover 9, made of sufficiently elastic and resilient material. Suitable materials include, e.g., Padding Material BockLite, manufactured by Otto Bock Healthcare (Minnesota, USA).

Both right and left shoulder tips can be moved independently from each other in three directions (up/down, closer to/further apart from the vertical support, and back/forward). The slope of the left shoulder is adjusted by means 10a, the left shoulder tip can be moved closer and further apart from the vertical support by means 11a and the left shoulder tip can be moved back and forth by means 12a. Similarly, means 10b, 11b and 12b are used for moving the right shoulder tip.

Each of the means 10a, 10b, 11a, 11b, 12a and 12b comprise a motor, such as electric motors 20a, 20b, 21a, 21b, 22a and 22b. Rotary motors are shown in FIGS. 2 to 7, coupled with rotary to linear conversion (such as a screw; t is apparent, that also a belt can be used for conversion). Also, instead of rotary electric motors, linear motors could be used. It is obvious that the rotary to linear conversion may be noisy, but it does not need power to hold the actuator in the correct position.

The mannequin further comprises means for changing the shape of back (see 13a and 13b) and means for changing the shape of chest (see 14a and 14b). Such means may comprise a motor (23a, 23b, 24a, 24b) and a telescopic link, actuated by the motor.

The actuator also comprises means for monitoring its linear position (such as sensors for sensing the nearest or farthest position of the actuator coupled with counting wheel).

Figure 8:
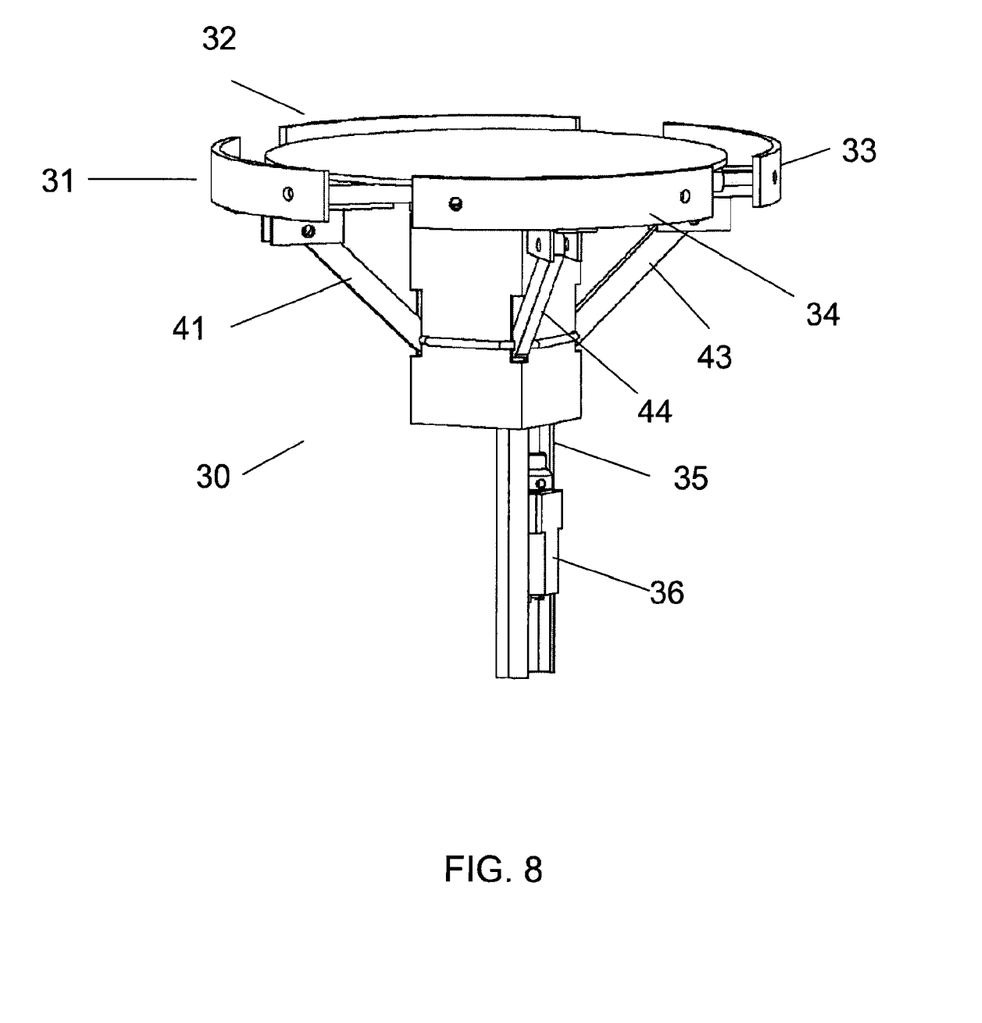
FIG. 8 is an exemplary embodiment of the neck section for the mannequin.

FIG. 8 depicts one example of the neck portion 30 for a computer controllable mannequin. The neck portion allows to adjust the diameter of the neck by moving elements 31 to 34 (even though 4 elements are shown on FIG. 8, there number of elements is not critical). The neck portion has a vertical element 35 and a motor 36 for providing linear movement that is transformed, through 4 links (shown as 41, 43 and 44; one link is hidden in FIG. 8) into radial movement of elements 31 to 34.

Additionally to the vertical support 7, the mannequin could comprise a spine-like structure to provide better approximation for the back area. The spine-like structure is made of flexible and stretchable material (such as strong spiral spring) attached to the vertical support through extendable links that are substantially perpendicular to the vertical support. Each link comprises an actuator (such as linear motor or rotary motor with rotary to linear conversion) so that the distance from the vertical support and thus, the curvature of the spine like structure, can be adjusted as needed. It is appreciated that to mimic a curvature of the spine, 5 extendable links are required (4, if one end of the spine is rigidly attached to the vertical support).

Instead of actuators powered by electric motors, also other types of actuators, such as gas or fluid powered actuators can be used.

The mannequin is controlled by a computer, such as PC. In a preferred embodiment, the mannequin has a control block, whereas all the motors are connected with the control block with controllers. The control block is preferably connected with the computer through a standard port, such as USB port. In this case, the mannequin can be controlled through (graphic) user interface (GUI). Similarly to computer peripheral devices such as printers and scanners, the mannequin is preferably designed as plug and play device. Preferably, the mannequin is automatically adjusted to represent the body of the customer, based on 3D image, without the need to enter any additional data or information.

The mannequin and the system as described can also be used in the process of designing designer clothing. The piece of clothing is put on the mannequin. Then, the size and/or body shape (posture) of the mannequin is changed according to an algorithm stored in and run by the computer. For example, during the design process, the designer can quickly see how the piece of clothing looks in different sizes and on people with different body shapes, types and postures. The mannequin can also be used in the process of designing new designs of clothing for mass production. Then the mannequin can be used instead of real person having required measurements (e.g., size 50). Also, the measurements of such model person differ from one area to another. Using the data gathered by different projects (e.g., e-tailor), the mannequin can be adjusted to exactly mimic a person from a particular country or other geographical region. It is particularly useful when the clothing company is developing new products for distant markets.

In addition to the upper body section, the mannequin may also have to lower body section, or a lower body mannequin could be built separately, using the same principles as described above in relation to upper body mannequin.

The exemplary embodiments presented herein illustrate the principles of the invention and are not intended to be exhaustive or to limit the invention to the form disclosed; it is intended that the scope of the invention be defined by the claims appended hereto and their equivalents.

The invention claimed is:

1. A method for demonstrating a piece of actual clothing to a customer to facilitate trying-on and purchasing processes, the method comprising:
obtaining a set of data, by a computer, representing customer's body configuration;
determining, by the computer, from said set of data, a first standardized size for said piece of actual clothing that is a closest match to customer's body configuration;
putting a first piece of actual clothing with said first standardized size on a mechanical mannequin with measurements corresponding to said set of customer's body configuration, the mechanical mannequin including a first body portion, a first motor, a second body portion, and a second motor, the first body portion being adjustable to the measurements via the first motor independent of the second body portion, the second body portion being adjustable to the measurements via the second motor independent of the first body portion;
obtaining a first set of images showing said first piece of actual clothing on said mechanical mannequin as adjusted via at least one of the first motor or the second motor; and
presenting to the customer said first set of images via a communications network showing said first piece of actual clothing on said mechanical mannequin.

2. The method as in claim 1, comprising mechanically adjusting the size of said mechanical mannequin.

3. The method as in claim 2, comprising mechanically adjusting the size of said mechanical mannequin using computer controllable means.

4. The method as in claim 3, comprising adjusting the shape of said mechanical mannequin to represent the body type of the customer.

5. The method as in claim 4, comprising moving at least one region of said mechanical mannequin in a manner characteristic to a human being at the time of wearing or trying on process.

6. The method as in claim 5, comprising adjusting chest measurements and the shape of at least one shoulder of said mechanical mannequin.

7. The method as in claim 6, comprising adjusting neck measurements of said mechanical mannequin.

8. The method as in claim 7, further comprising:
putting on said mechanical mannequin a second piece of actual clothing that is one standardized size smaller than said first standardized size;
obtaining a second set of images demonstrating said second piece of actual clothing; and
presenting to the customer said second set of images showing said second piece of actual clothing on said mechanical mannequin.

9. The method as in claim 8, further comprising:
putting on said mechanical mannequin a third piece of actual clothing that is one standardized size larger than said first standardized size;
obtaining a third set of images demonstrating said third piece of actual clothing; and
presenting to the customer said third set of images representing said third piece of actual clothing.

10. The method as in claim 9, comprising providing the customer with a fourth set of images showing said piece of actual clothing as envisioned by the designer of said actual piece of clothing.

11. The method as in claim 10, wherein said first, second, third and fourth set of images are presented side by side.

12. The method as in claim 11, comprising taking said images by videographic means.

13. A method of designing designer clothing on a computer controllable mechanically adjustable mechanical mannequin, said method comprising:
putting a piece of actual clothing on said mechanical mannequin, the mechanical mannequin including a first body portion, a first motor, a second body portion, and a second motor, the first body portion being adjustable via the first motor independent of the second body portion, the second body portion being adjustable via the second motor independent of the first body portion;
computing, by a computing device, a standardized size of a customer of the piece of clothing; and
automatically adjusting at least one of the first body portion or the second body portion of said mechanical mannequin via at least one of the first motor or the second motor to a pre-set standardized size to enable the customer to evaluate the fit of the piece of actual clothing for said pre-set standardized size.

14. The method according to claim 13, wherein said method further includes putting on multiple additional pieces of clothing of the same type having different standardized sizes on said mechanical mannequin that has been automatically adjusted to enable the customer to evaluate which of the sizes of the different pieces of clothing fits best.

15. The method according to claim 14, wherein putting on different pieces of actual clothing of the same type on said mechanical mannequin that has been automatically adjusted includes putting on (i) a second piece of actual clothing that is one standardized size larger than the computed standardized size and (ii) a third piece of actual clothing that is one standardized size smaller than the computed standardized size.

16. The method as in claim 1, wherein at least one of the first body portion or the second body portion is adjustable in at least three directions.

17. The method according to claim 13, wherein at least one of the first body portion or the second body portion is adjustable in at least three directions.

\* \* \* \* \*